US009946710B2

United States Patent
Yamaguchi

(10) Patent No.: US 9,946,710 B2
(45) Date of Patent: Apr. 17, 2018

(54) LANGUAGE CONVERSION APPARATUS, LANGUAGE CONVERSION METHOD, AND LANGUAGE CONVERSION PROGRAM

(71) Applicant: SoftBank Corp., Tokyo (JP)

(72) Inventor: Keita Yamaguchi, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 0 days.

(21) Appl. No.: 15/312,443

(22) PCT Filed: Jan. 8, 2015

(86) PCT No.: PCT/JP2015/050385
§ 371 (c)(1),
(2) Date: Nov. 18, 2016

(87) PCT Pub. No.: WO2015/178042
PCT Pub. Date: Nov. 26, 2015

(65) Prior Publication Data
US 2017/0091180 A1    Mar. 30, 2017

(30) Foreign Application Priority Data
May 21, 2014 (JP) ................................ 2014-104875

(51) Int. Cl.
*G06F 17/27* (2006.01)
*G06F 17/28* (2006.01)
(Continued)

(52) U.S. Cl.
CPC ........ *G06F 17/2872* (2013.01); *G06F 17/274* (2013.01); *G06F 17/2725* (2013.01)

(58) Field of Classification Search
None
See application file for complete search history.

(56) References Cited

U.S. PATENT DOCUMENTS 7,581,255 B2 * 8/2009 Alkove ............... G06F 21/10
380/201
7,610,575 B2 * 10/2009 Sproule ............... G06Q 10/063
705/348
(Continued)

FOREIGN PATENT DOCUMENTS

JP    2000-322245    11/2000

OTHER PUBLICATIONS

Transformation of GUHA association rules to business rules for implementation using JBoss Drools by Stanislav Vojir (ITAT conference, Sep. 2013).*

*Primary Examiner* — Neeraj Sharma

(57) ABSTRACT

Business rule statements written in a natural language are automatically converted into DRL language sentences. A language conversion apparatus 10 includes: a storage device 16 that stores syntax definition information 30 for defining syntaxes to convert a business rule statement written in a natural language into a DRL language sentence on a syntax basis, and conversion information 40 for converting element variables of the business rule statement into element variables of the DRL language sentence; and a CPU 11 that analyzes a syntax of the business rule statement by comparing the business rule statement with the syntax definition information 30 and converts the business rule statement into the DRL language sentence by referring to the conversion information 40.

5 Claims, 22 Drawing Sheets

(51) Int. Cl.
  *G10L 21/00*  (2013.01)
  *G10L 15/00*  (2013.01)
  *H04M 1/64*  (2006.01)
  *G06F 17/30*  (2006.01)
  *G06Q 40/00*  (2012.01)
  *G06Q 10/00*  (2012.01)
  *H04N 7/167*  (2011.01)
  *G06F 9/44*  (2018.01)

(56) References Cited

U.S. PATENT DOCUMENTS

| | | | | |
|---|---|---|---|---|
| 8,615,731 B2* | 12/2013 | Doshi | ............... | G06F 8/24 |
| | | | | 717/106 |
| 2002/0194045 A1* | 12/2002 | Shay | ............... | G06Q 10/06311 |
| | | | | 705/7.15 |
| 2009/0113384 A1* | 4/2009 | Kosov | ............... | G06F 8/34 |
| | | | | 717/105 |
| 2010/0058287 A1* | 3/2010 | Sundararajan | ............... | G06F 8/71 |
| | | | | 717/104 |
| 2010/0131399 A1* | 5/2010 | Anand | ............... | G06Q 30/00 |
| | | | | 705/35 |
| 2013/0290239 A1* | 10/2013 | Vaquero | ............... | G06N 5/025 |
| | | | | 706/47 |
| 2014/0257935 A1* | 9/2014 | Killoh | ............... | G06Q 30/0276 |
| | | | | 705/7.35 |
| 2015/0212812 A1* | 7/2015 | Tripathi | ............... | G06F 8/60 |
| | | | | 717/120 |
| 2015/0220553 A1* | 8/2015 | Poon | ............... | G06F 17/30427 |
| | | | | 707/722 |

* cited by examiner

Fig. 2

| BRMS Natural Language Sentence | $A$ is identical to $B$ |
|---|---|
| DRL Language Sentence | $A$==$B$ |

Fig. 3

| Element Variable | Syntax Element | Element Variable | Syntax Element |
|---|---|---|---|
| $A$ | is | $B$ | identical to |

Fig. 4

| Element Variable | Syntax Element | Element Variable | Syntax Element |
|---|---|---|---|
| Type Code of Contractor Information (Present) | is | "01" | identical to |

Fig. 5

| $A$ | Type Code of Contractor Information (Present) |
|---|---|
| $B$ | "01" |

Fig. 6

$Contractor Information_Present_.get Contractor Type Code()=="01"

Fig. 7

| BRMS Natural Language Sentence | DRL Language Sentence | Explanation |
|---|---|---|
| oyobi | && | AND |
| matawa | \|\| | OR |
| (Negation) | !( ) | NOT |
| ( ) | ( ) | ( ) |

Fig. 8

| Control Structure | BRMS Natural Language Sentence | DRL Language Sentence |
|---|---|---|
| Definition Unit | Definition | when |
| Condition Unit | Hypothetical Condition | eval( |
| Processing Unit | In That Case | )then |

Fig. 9

| BRMS Natural Language Sentence | Setting: It is assumed that certain A is circuit information, here B is identical to this circuit information. |
|---|---|
| DRL Language Sentence | $Circuit Information: A(B==this) |

Fig. 10

| BRMS Natural Language Sentence | A is identical to B | |
|---|---|---|
| DRL Language Sentence | A==B | In case of integer variable |
| | A.equals(B) | In case of object |

Fig. 11

| DRL Language Sentence | A!=null&&A.equals(B) | In case of object |

Fig. 12

| BRMS Natural Language Sentence | (Negation) Numerical Condition: There is no A |
|---|---|
| DRL Language Sentence | !(A==0) |

Fig. 13

| BRMS Natural Language Sentence | A is identical to B | |
|---|---|---|
| DRL Language Sentence | A==B | Definition Unit |
| | A.equals(B) | Condition Unit |

Fig. 14

| BRMS Natural Language Sentence | A is one of {"UD", "UH"} | |
|---|---|---|
| DRL Language Sentence | A in("UD"、"UH") | Definition Unit |
| | A.equals("UD") \|\| A.equals("UH") | Condition Unit |

Fig. 15

| BRMS Natural Language Sentence | Method: <<Character String Acquisition>> Character string from <1>th character to <1>th character of <A> is identical to"1" |
|---|---|
| DRL Language Sentence | rule Function.allSabString(A,I,I).equals("I") |

Fig. 16

| BRMS Natural Language Sentence | Numerical Condition: There is no A, here attribute of A is the same as that of B | |
|---|---|---|
| DRL Language Sentence | $var1:Long()from accumulate ($a1:A(A.attribute!=null&&A.attribute.equals(B),count($a1))) | Definition Unit |
| | $var1==0 | Condition Unit |

LANGUAGE CONVERSION APPARATUS, LANGUAGE CONVERSION METHOD, AND LANGUAGE CONVERSION PROGRAM

CROSS-REFERENCE TO RELATED APPLICATION(S)

This application is a national phase application under 35 U.S.C. § 371 of PCT Application PCT/JP2015/050385, filed Jan. 8, 2015, which claims priority to Japanese Patent Application No. 2014-104875, filed May 21, 2014, which are all hereby incorporated by reference.

TECHNICAL FIELD

The present invention relates to an apparatus, method, and program for converting business rule statements written in a natural language into DRL (Drools Rule Language) language sentences.

BACKGROUND ART

A computer system for automatically defining and registering rules, conditions, judgment standards for business purposes, or coping strategies from experiences as business rules and making complicated business judgments on the basis of a combination of such business rules is called a business rule management system (BRMS) and is used for, for example, credit or insurance examinations in the financial industry, or bill calculation based on complicated discount plans for cell-phone bills. The business rules are defined in a production rule (if-then rule) format of "if . . . , do . . . (or do not . . . )." Conventionally, an expert called a knowledge engineer is required to set the business rules; however, the business rule management systems in recent years can register and change the business rules by using a natural language and a mechanism for, for example, excluding conflicting business rules, so that even persons who do not have specialized knowledge can operate the business rule management systems. A product called JRules provided by IBM is known as such a business rule management system.

BRIEF SUMMARY

Technical Problem

However, not all products which are commercially used as business management systems are necessarily capable of writing business rules in a natural language. For example, a product called JBoss provided by RedHat cannot write business rules in a natural language, so it is necessary to write the business rules in a DRL language. Therefore, when business rules which are written in a natural language in order to use them for products such as JRules are to be used for JBoss, they need to be converted into the DRL language. However, large amounts of labor and expense are required in order to conduct such a language conversion manually.

Therefore, it is an object of the present invention to provide an apparatus, method, and program for automatically converting business rule statements written in a natural language into DRL language sentences.

Solution to Problem

In order to solve the above-described problem, provided according to the present invention is a language conversion apparatus comprising: a storage device that stores syntax definition information for defining a plurality of syntaxes for converting a business rule statement, which is written in a natural language and composed of one or more syntax elements, into a DRL language sentence on a syntax basis, and conversion information for converting an element variable included in the syntax element or syntax elements of the business rule statement into an element variable of the DRL language sentence; a syntax analysis device for judging which one of the plurality of syntaxes defined by the syntax definition information matches a syntax of the business rule statement, by comparing a character string of the business rule statement with a character string of the syntax element constituting each syntax defined by the syntax definition information; and a conversion device that converts the business rule statement into the DRL language sentence by converting the element variable of the business rule statement into the element variable of the DRL language sentence with reference to the conversion information and converting the syntax element other than the element variable of the business rule statement into a syntax element of the DRL language sentence having the syntax which has been judged to match the syntax of the business rule statement. According to such configuration, the business rule sentence written in the natural language can be converted into the DRL language sentence.

The syntax definition information may be classified into patterns so that, for example, the business rule can be converted into the DRL language sentence by means of a combination of a plurality of types of basic syntaxes. It was found through the ardent efforts of the inventors of the present invention that a business rule can be converted into a DRL language sentence by means of the combination of a plurality of types of basic syntaxes. As a result, the language conversion processing can be simplified.

The syntax definition information may include information about character strings, which distinguish and define a control syntax depending on its type, and may define conversion of a specific syntax written in the business rule statement into a DRL language sentence which varies depending on the type of the control syntax in which the specific syntax is written. The syntax analysis device may judge whether or not a character string which defines the control syntax is written in the specific syntax of the business rule statement; and when an affirmative result of the judgment is obtained, the conversion device may convert the specific syntax into the DRL language sentence which varies depending on the type of the control syntax. As a result, flexible language conversion can be performed depending on the type of the control syntax.

The business rule statement may include a nested structure in which a plurality of syntaxes are nested. The syntax analysis device may analyze a syntax of the entire nested structure. The conversion device may prioritize an inner syntax inside the nested structure upon conversion to the DRL language sentence. As a result, the language conversion can be performed by appropriately analyzing the complicated nested structure.

A language conversion method executed by a computer according to the present invention includes: a step of comparing a character string of a syntax element, which constitutes each syntax defined by syntax definition information for defining a plurality of syntaxes for converting a business rule statement written in a natural language and composed of one or more syntax elements, into a DRL language sentence on a syntax basis, with a character string of the business rule statement, thereby judging which one of the plurality of syntaxes defined by the syntax definition information matches a syntax of the business rule statement; and a step of converting the business rule statement into the DRL language sentence by referring to conversion information for converting an element variable included in the syntax element or syntax elements of the business rule statement into an element variable of the DRL language sentence and thereby converting the element variable of the business rule statement into the element variable of the DRL language sentence, and converting the syntax element other than the element variable of the business rule statement into a syntax element of the DRL language sentence having the syntax which has been judged to match the syntax of the business rule statement. By this method, the business rule statement written in the natural language can be automatically converted to a DRL language sentence.

A language conversion program according to the present invention causes a computer to execute: a step of comparing a character string of a syntax element, which constitutes each syntax defined by syntax definition information for defining a plurality of syntaxes for converting a business rule statement written in a natural language and composed of one or more syntax elements, into a DRL language sentence on a syntax basis, with a character string of the business rule statement, thereby judging which one of the plurality of syntaxes defined by the syntax definition information matches a syntax of the business rule statement; and a step of converting the business rule statement into the DRL language sentence by referring to conversion information for converting an element variable included in the syntax element or syntax elements of the business rule statement into an element variable of the DRL language sentence and thereby converting the element variable of the business rule statement into the element variable of the DRL language sentence, and converting the syntax element other than the element variable of the business rule statement into a syntax element of the DRL language sentence having the syntax which has been judged to match the syntax of the business rule statement.

Advantageous Effects of the Invention

According to the present invention, business rule statements written in a natural language can be automatically converted to DRL language sentences.

BRIEF DESCRIPTION OF DRAWINGS

FIG. 2 is a diagram for explaining language conversion processing according to this embodiment;

FIG. 3 is a diagram for explaining the language conversion processing according to this embodiment;

FIG. 4 is a diagram for explaining the language conversion processing according to this embodiment;

FIG. 5 is a diagram for explaining the language conversion processing according to this embodiment;

FIG. 6 is a diagram for explaining the language conversion processing according to this embodiment;

FIG. 7 is a diagram for explaining the language conversion processing according to this embodiment;

FIG. 8 is a diagram for explaining the language conversion processing according to this embodiment;

FIG. 9 is a diagram for explaining the language conversion processing according to this embodiment;

FIG. 10 is a diagram for explaining the language conversion processing according to this embodiment;

FIG. 11 is a diagram for explaining the language conversion processing according to this embodiment;

FIG. 12 is a diagram for explaining the language conversion processing according to this embodiment;

FIG. 13 is a diagram for explaining the language conversion processing according to this embodiment;

FIG. 14 is a diagram for explaining the language conversion processing according to this embodiment;

FIG. 15 is a diagram for explaining the language conversion processing according to this embodiment;

FIG. 16 is a diagram for explaining the language conversion processing according to this embodiment;

DESCRIPTION OF EMBODIMENTS

An embodiment of the present invention will be explained below with reference to each drawing.

Figure 1:
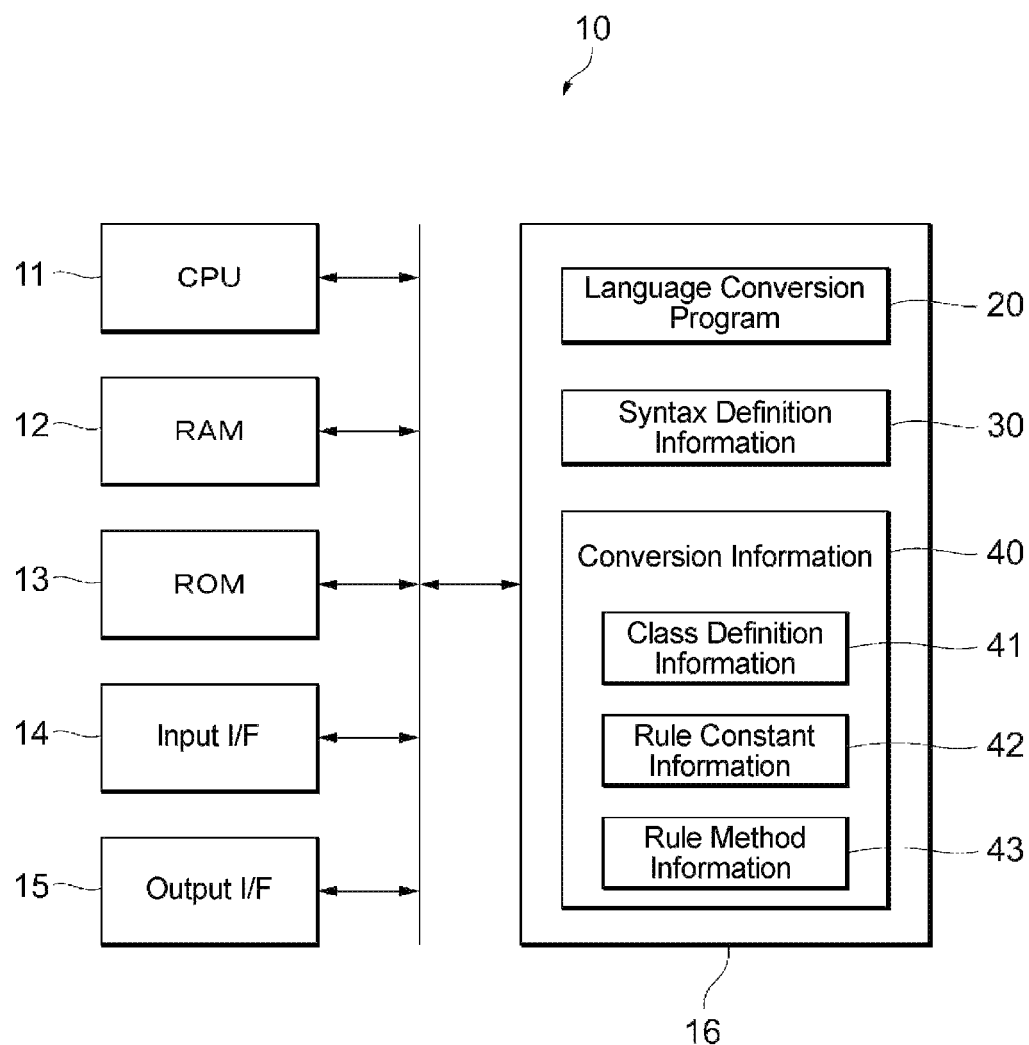
FIG. 1 is a block diagram illustrating the configuration of a language conversion apparatus according to this embodiment.

FIG. 1 is a block diagram illustrating the configuration of a language conversion apparatus 10 according to this embodiment. The language conversion apparatus 10 is a computer for converting a business rule statement(s) written in a natural language into a DRL language sentence(s). In this description, the business rule statement(s) written in the natural language will be referred to as "BRMS natural language sentence(s)." The language conversion apparatus 10 includes a CPU 11, a RAM 12, a ROM 13, an input interface 14, an output interface 15, and a storage device 16. The storage device 16 is computer-readable storage media (for example, writable nonvolatile memories such as flexible disks, magneto-optical disks, ROMs, or flash memories, portable media such as DVDs, or storage resources such as hard disk drives or solid state drives). The storage device 16 stores a language conversion program 20, syntax definition information 30, and conversion information 40. The language conversion program 20 is a computer program for converting the BRMS natural language sentences into the DRL language sentences. A language conversion function implemented by cooperation between the CPU 11 and the language conversion program 20 is called a language conversion tool or a language conversion engine.

Figure 17:
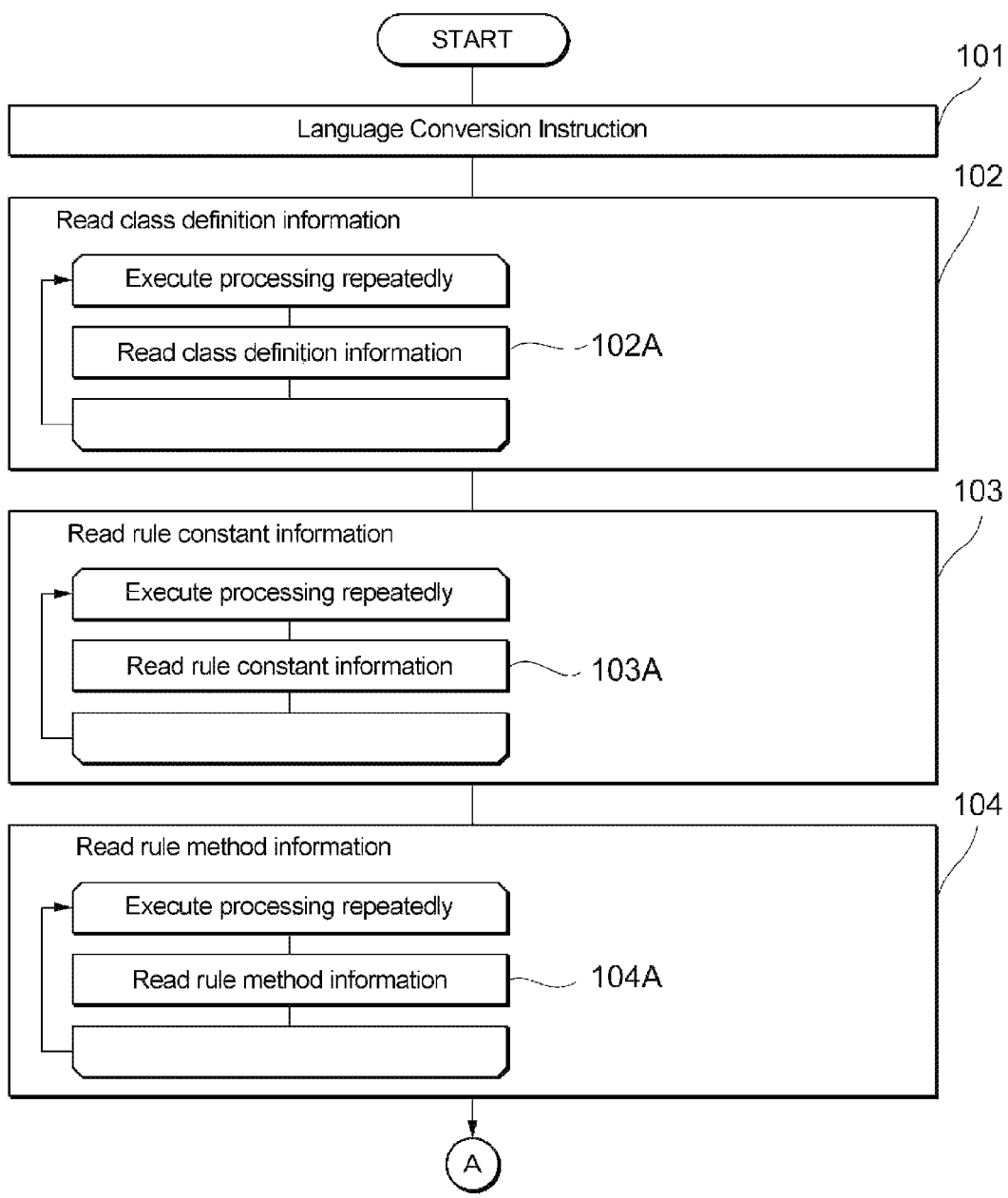
FIG. 17 is a flowchart illustrating a flow of the language conversion processing according to this embodiment.
Figure 18:
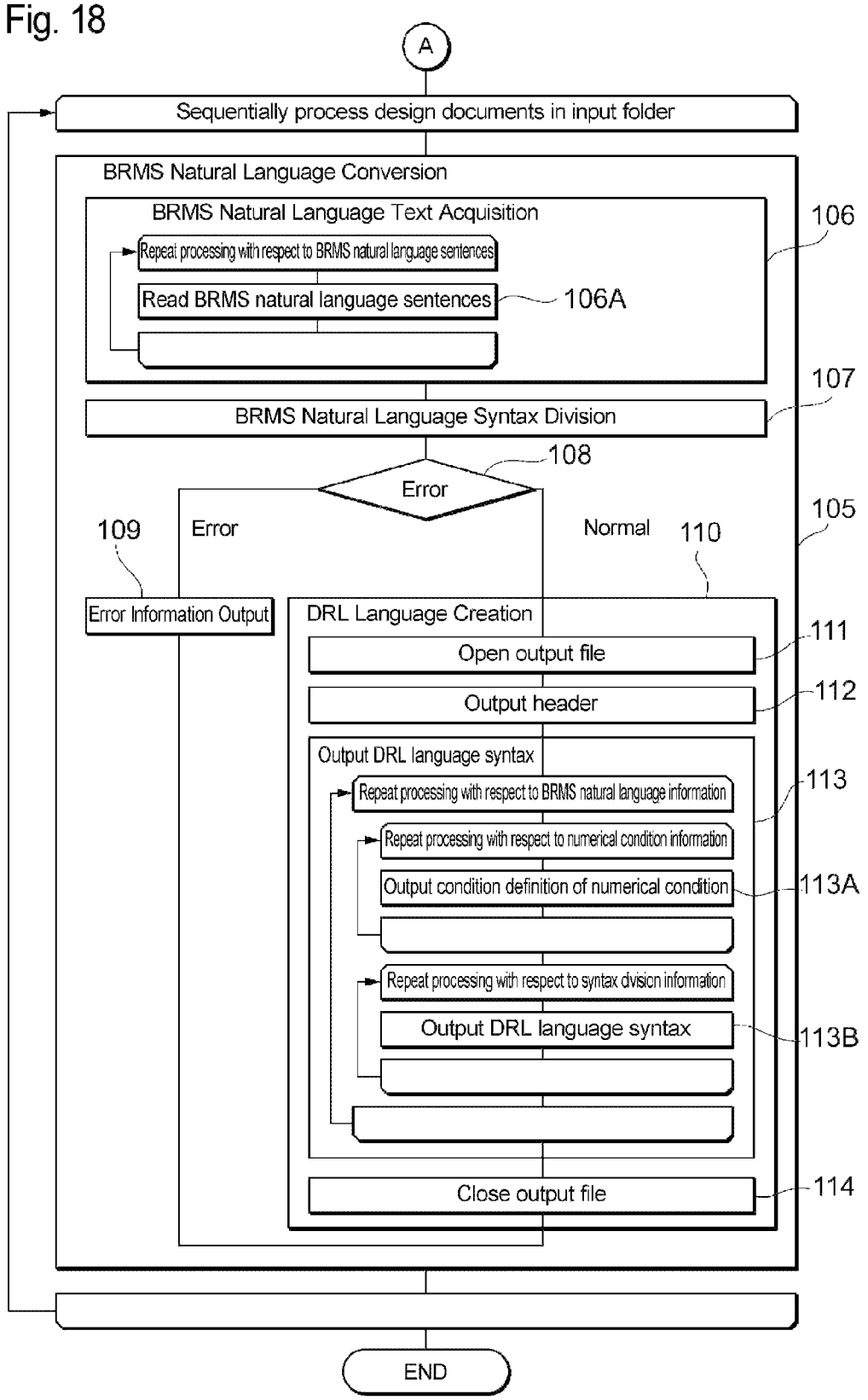
FIG. 18 is a flowchart illustrating a flow of the language conversion processing according to this embodiment.
Figure 19:
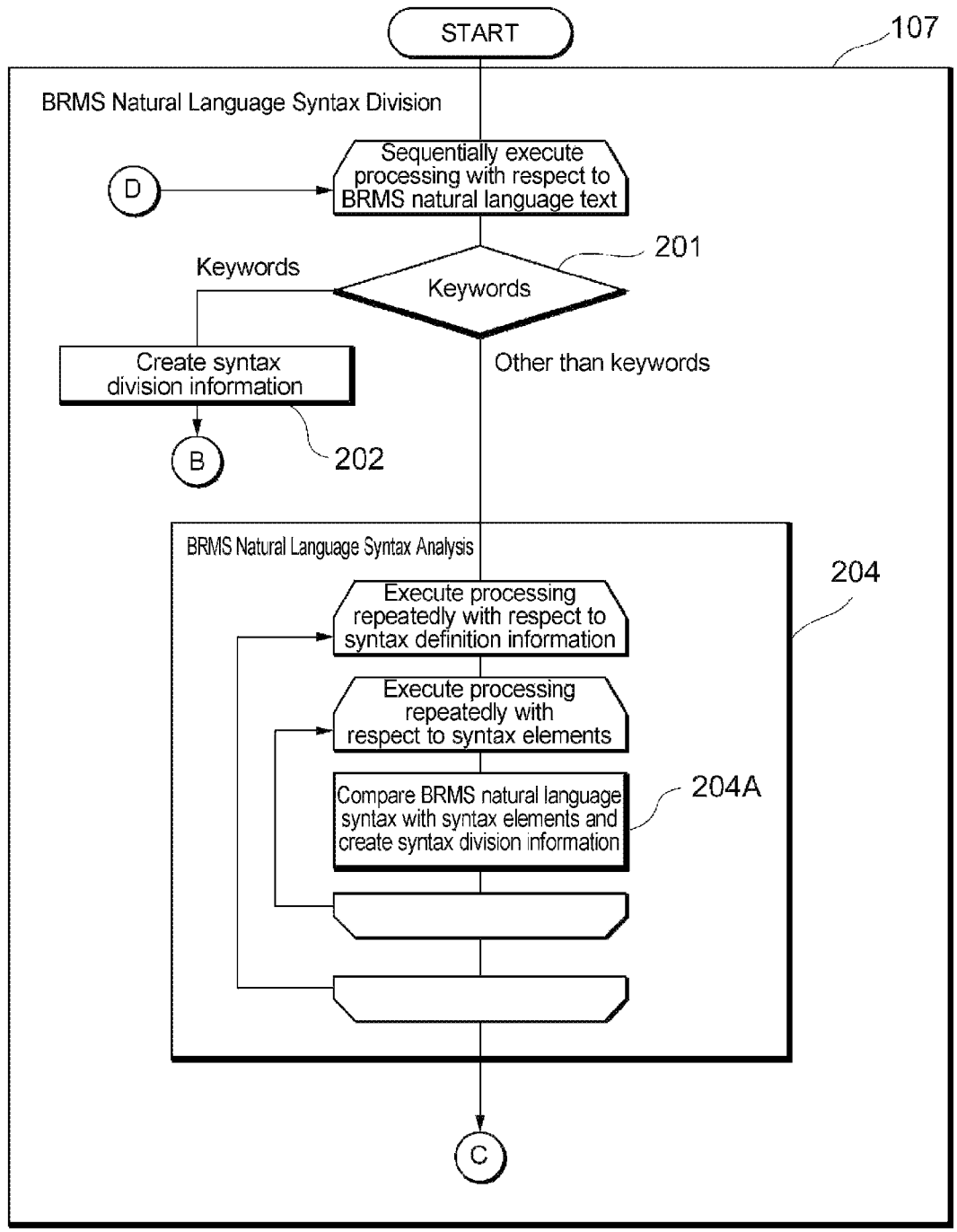
FIG. 19 is a flowchart illustrating a flow of the language conversion processing according to this embodiment.
Figure 20:
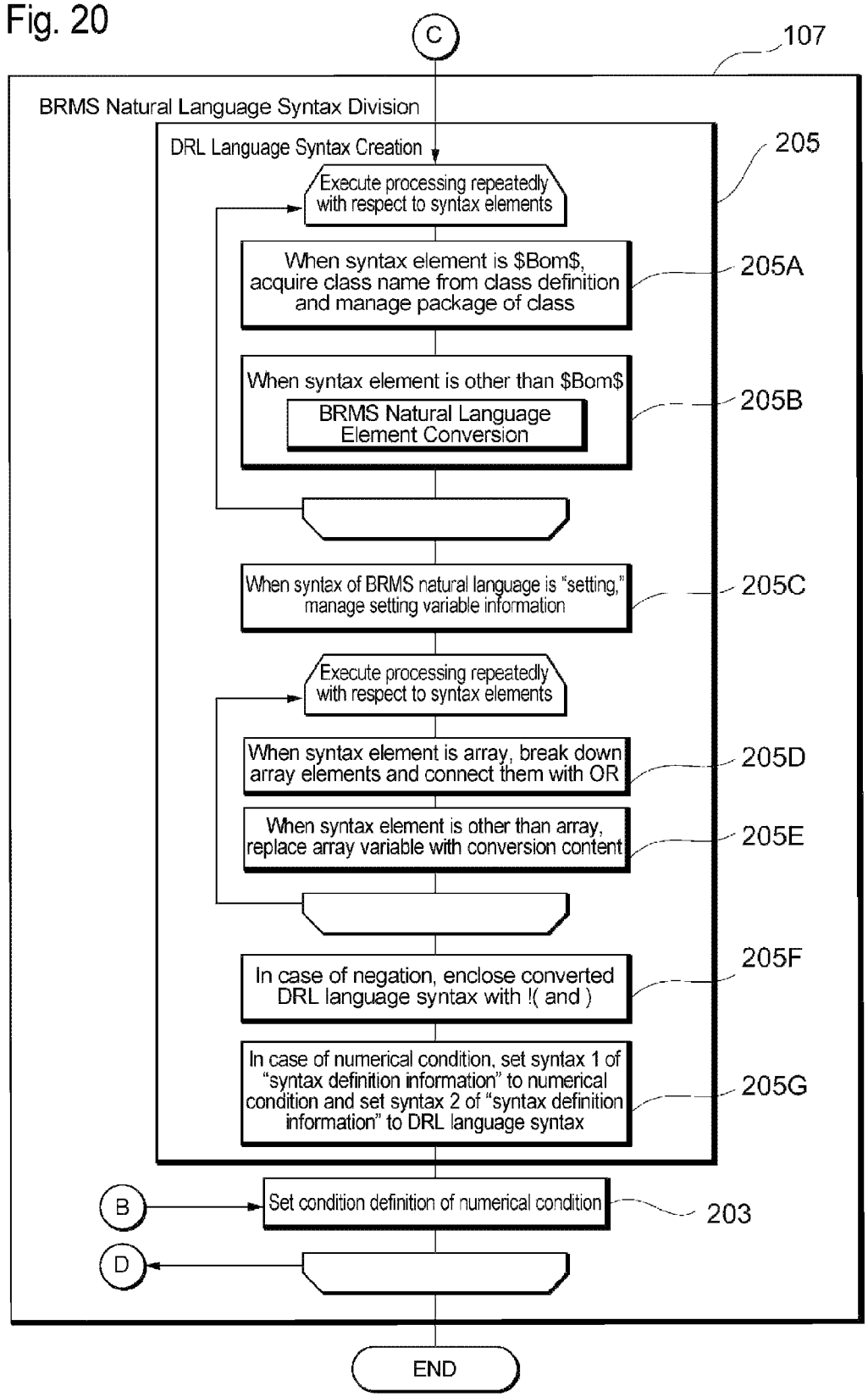
FIG. 20 is a flowchart illustrating a flow of the language conversion processing according to this embodiment.
Figure 21:
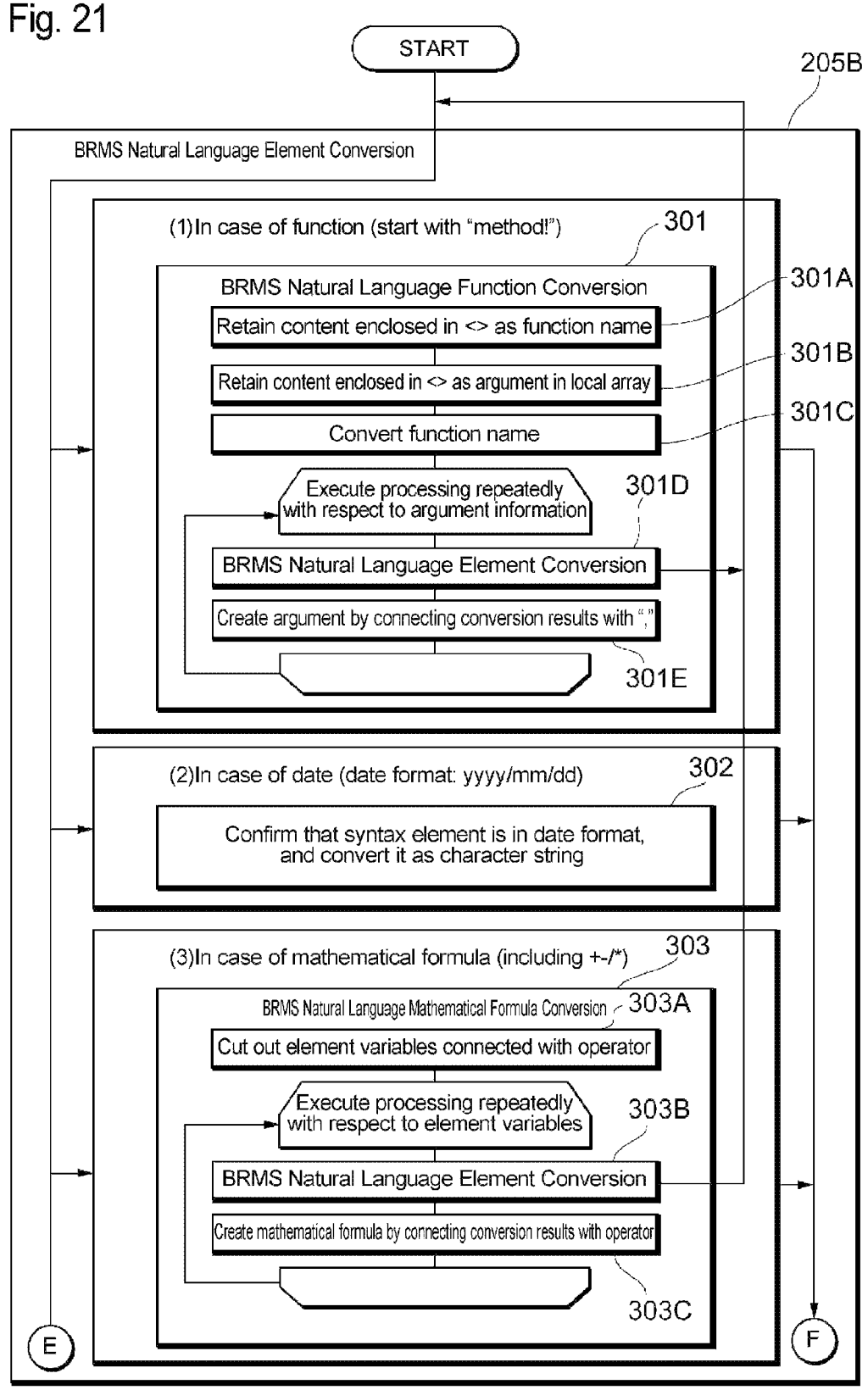
FIG. 21 is a flowchart illustrating a flow of the language conversion processing according to this embodiment.
Figure 22:
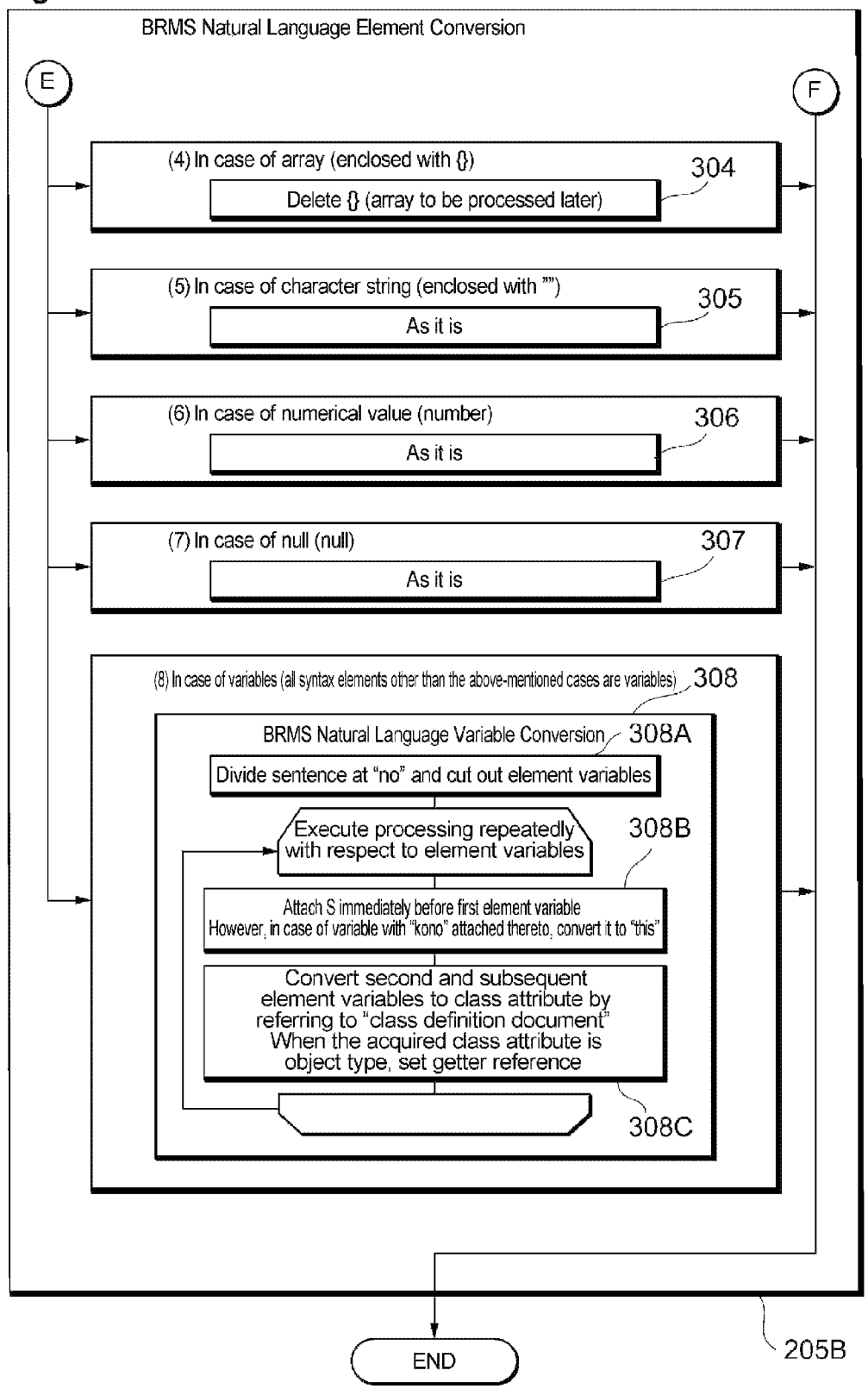
FIG. 22 is a flowchart illustrating a flow of the language conversion processing according to this embodiment.

The language conversion program 20 includes a plurality of software modules, which are invoked as subroutines from its main program, for executing read processing (steps 102 to 104 illustrated in FIG. 17) and language conversion processing (step 105 illustrated in FIG. 18). The software module for executing the language conversion processing (step 105 illustrated in FIG. 18) includes: a submodule for executing processing for reading a BRMS natural language sentence (step 106 illustrated in FIG. 18); a submodule for executing processing for dividing the BRMS natural language sentence (step 107 illustrated in FIG. 18); a submodule for executing an error judgment (step 108 illustrated in FIG. 18); a submodule for executing error information output processing (step 109 illustrated in FIG. 18); and a submodule for executing DRL language sentence creation processing (step 110 illustrated in FIG. 18). The submodule for executing the BRMS natural language sentence division processing (step 107 illustrated in FIG. 18) includes subordinate modules for executing respective steps illustrated in FIG. 19 to FIG. 22. The details of the respective steps illustrated in FIG. 17 to FIG. 22 will be explained later. However, a function of each step does not necessarily have to be implemented by a software module and part or all of the function may be implemented by a hardware module of the language conversion apparatus 10.

The syntax definition information 30 defines a plurality of syntaxes for converting a BRMS natural language sentence(s) into a DRL language sentence(s) on a syntax basis. The conversion information 40 defines information for converting element variables of the BRMS natural language sentences into element variables of the DRL language sentences. The conversion information 40 includes, for example: class definition information 41 for defining conversion of class variables of the BRMS natural language sentences into class variables of the DRL language sentences; rule constant information 42 for defining conversion of global variables of the BRMS natural language sentences into global variables of the DRL language sentences; and rule method information 43 for defining conversion of methods of the BRMS natural language sentences into methods of the DRL language sentences. The class definition information 41 defines class names and information about the classes, that is, a combination of attributes constituting the classes. The class names are class names which are defined in the class definition information 41. The rule constant information 42 is obtained by associating BRMS natural language constant names, DRL language constant names, and constant types with each other. The rule method information 43 is obtained by associating BRMS natural language function names, DRL language function names, and function types with each other.

The CPU 11 interprets and executes the language conversion program 20 and thereby executes processing for analyzing the syntax of the BRMS natural language sentences on the basis of the syntax definition information 30 and converting the BRMS natural language sentences into the DRL language sentences with reference to the conversion information 40. The RAM 12 functions as a work area for the CPU 11 and reads necessary information for the language conversion (for example, the syntax definition information 30 and the conversion information 40). The ROM 13 is a nonvolatile memory for storing programs such as BIOS of the CPU 11. The input interface 14 is an interface for inputting the BRMS natural language sentences. The output interface 15 is an interface for outputting the DRL language sentences which have been converted from the BRMS natural language sentences.

Next, the outlines of the language conversion processing will be explained with reference to FIG. 2 to FIG. 8.

The syntax definition information 30 defines any and all conversion patterns from the BRMS natural language sentences into the DRL language sentences on a syntax basis. One syntax is composed of a plurality of syntax elements and the syntax elements include element variables. The element variables include class variables, global variables, methods, character strings, numerical values, dates, arrays, and mathematical formulas. Both the syntax elements and the element variables have a common aspect as elements constituting a syntax; however, the syntax elements and the element variables have different aspects as the syntax elements serve as indexes for syntax analysis, while the element variables do not serve as indexes for the syntax analysis. The syntax definition information 30 contains keywords, flags indicative of key syntaxes, syntaxes of the BRMS natural language, the number of characters of the syntaxes, the range of a control structure to which the relevant syntax is applied, designation of the control structure, special processing on the syntax (such as conversion processing illustrated in FIG. 14), DRL language sentences for objects, DRL language sentences for variables, the number of syntax elements, and information on content of the syntax elements. The "keywords" mean character strings of the syntax elements which serve as the indexes for the syntax analysis; and specifically, the "keywords" include logical operators (such as "oyobi," "matawa," "(negation)," and "( )" as illustrated in FIG. 7) and control structures (such as a "definition unit," a "condition unit," and a "processing unit" as illustrated in FIG. 8). The "character strings" are units constituting the syntax elements and include not only those recognized as characters according to socially accepted standards (such as Chinese characters, hiragana characters, katakana characters, alphabets, Roman characters, and Greek characters), but also numbers, signs, and so on. The "flags indicative of key syntaxes" are identification information for identifying the syntaxes for which the use of the keywords is defined. The "information on content of the syntax elements" is information about the syntax elements and the element variables constituting the BRMS natural language sentences. An arrangement sequence of respective syntax elements and element variables constituting a syntax, and their character strings are previously defined in the syntax definition information 30. Therefore, any syntax which is not defined in the syntax definition information 30 cannot be converted into the DRL language sentence, which results in a conversion error. FIG. 2 illustrates an example of the language conversion defined by the syntax definition information 30 and a syntax "$A$ is identical to $B$" in the BRMS natural language is converted into a syntax "$A$==$B$" in the DRL language. Here, $A$ and $B$ are element variables, respectively. For ease of explanation, Japanese is indicated as an example of the natural language; however, there is no limitation on the language as long as the language can be understood by humans; for example, English, Chinese, German, French, and so on may be used.

The syntax "$A$ is identical to $B$" in the BRMS natural language sentence defined by the syntax definition information 30 is divided into a plurality of syntax elements as shown in FIG. 3. Meanwhile, FIG. 4 illustrates the specific BRMS natural language sentence which becomes a target of the language conversion, and is divided into a plurality of syntax elements. The CPU 11 compares the syntax of the BRMS natural language sentence, which is the target of the language conversion, with the syntax defined by the syntax definition information 30 and thereby judges that the syntax of the BRMS natural language sentence, which is the target of the language conversion, matches the syntax "$A$ is identical to $B$" which is defined by the syntax definition information 30. When the matching of the syntaxes is determined, the CPU 11 determines, as illustrated in FIG. 5, that a "contractor type code of contractor information (present)" corresponds to the element variable $A$ and "01" corresponds to the element variable $B$. An element variable that is written in a format of "XXX no YYY (YYY of XXX)" like the "contractor type code of contractor information (present)" is a class variable; and in this example, the "contractor information (present)" is a parent class (superclass) of the "contractor type code." The CPU 11 converts the class variable by referring to the class definition information 41. The "contractor type code of contractor information (present)" is converted to $Contractor Information_Present_get Contractor Type Code( )" by using a Method get Contractor Type Code( ) which commands the acquisition of the "contractor type code" which is a child class (subclass) of the "contractor information (present)." An argument of the method can designate all types of element variables. Meanwhile, the phrase enclosed in " " is recognized as a "character string." The CPU 11 converts "01," which is a character string, into "01" as it is. As a result of such processing, the business rule statement written in the natural language as illustrated in FIG. 4 is converted into the DRL language sentence illustrated in FIG. 6. Incidentally, when the element variable is a global variable, conversion of the global variable is conducted by referring to the rule constant information 42; and when the element variable is a method, conversion of the method is conducted by referring to the rule method information 43. When the element variable is a numerical value, a date, an array, or a mathematical formula, it is converted as it is. Here, the date is in the format of YYYY/MM/DD or YYYY (year), MM (month), DD (date). An array is in the format of {a, b, . . . , c} and all types of element variables can be designated by using a, b, . . . , c. A mathematical formula is composed of a combination of numbers and arithmetic operators and "+," "−," "×," "÷," and ( ) can be designated as the arithmetic operators.

Since both the BRMS natural language sentences and the DRL language sentences can be written as logical expressions connected with logical operators, the CPU 11 conducts the language conversion by distinguishing between the logical operators and the logical expressions. For example, conversion of the logical operators is also defined in the syntax definition information 30 as illustrated in FIG. 7. Furthermore, the BRMS natural language sentences may have a plurality of types of control syntaxes (such as a "definition unit," a "condition unit," and a "processing unit"). The CPU 11 conducts the language conversion by distinguishing the types of the control syntaxes. For example, conversion of the control syntaxes is also defined in the syntax definition information 30 as illustrated in FIG. 8. More specifically, the syntax definition information 30 may include information for character strings to distinguish and define the control syntaxes depending on their types and may define conversion of a specific syntax written in a BRMS natural language sentence into different DRL language sentences depending on the types of the control syntaxes in which the specific syntax is written.

The BRMS natural language sentence may include a nested structure in which a plurality of syntaxes are nested. The CPU 11 analyzes the syntax of the entire nested structure and conducts the conversion into the DRL language sentence by prioritizing an inner syntax inside the nested structure.

Incidentally, since breaks in a BRMS natural language sentence can be judged based on keywords such as the logical operators, control syntaxes, and punctuation marks, one syntax can be broken at an arbitrary position and written in more than one line.

The syntax definition information 30 is classified into patterns so that the BRMS natural language sentences can be converted into the DRL language sentences by means of a combination of a plurality of types of basic syntaxes. Examples of the basic language conversion will be explained with reference to FIG. 9 to FIG. 16. Referring to FIG. 9, the syntax definition information 30 may be defined so that an element variable with "kono" among element variables in a BRMS natural language sentence may be converted into "this." For example, a BRMS natural language sentence reciting that "Setting: It is assumed that certain A is circuit information, here B is identical to this circuit information" is converted into a DRL language sentence "$Circuit Information: A(B==this)".

Referring to FIG. 10, the syntax definition information 30 may be defined so that a BRMS natural language sentence is converted into different DRL language sentences depending on the type of the element variables. For example, when the element variables are integer variables, a BRMS natural language sentence "A is identical to B" is converted into a DRL language sentence "A==B". On the other hand, when the element variables are objects, the BRMS natural language sentence "A is identical to B" is converted into a DRL language sentence "A.equals(B)". However, when object A is null, it becomes an "Exception," so that A!=null is added as illustrated in FIG. 11.

Referring to FIG. 12, the syntax definition information 30 may be defined so that the entire BRMS natural language sentence which is negated is enclosed with !( ) and converted into the DRL language sentence. For example, a BRMS natural language sentence reciting that "Numerical Condition: There is no A" is converted into a DRL language sentence "!(A==0)".

Referring to FIG. 13, the syntax definition information 30 may be defined so that a specific syntax written in a BRMS natural language sentence is converted into different DRL language sentences depending on the type of a control syntax in which the specific syntax is written. For example, when the BRMS natural language sentence "A is identical to B" is written in the definition unit, it is converted into a DRL language sentence "A==B". Since this language conversion is applied even if the element variable is an object, it is an exception to the language conversion illustrated in FIG. 10. On the other hand, when the BRMS natural language sentence "A is identical to B" is written in the condition unit, it is converted into a DRL language sentence "A.equals(B)".

Referring to FIG. 14, the syntax definition information 30 may be defined so that array elements of a BRMS natural language sentence are connected with "||" and converted into a DRL language sentence. For example, when a BRMS natural language sentence reciting that "A is one of {"UD," "UH"}" is written in the definition unit, it is converted into a DRL language sentence "A in ("UD," "UH")". On the other hand, when the BRMS natural language sentence reciting that "A is one of {"UD," "UH"} is written in the condition unit, it is converted to a DRL language sentence "A.equals("UD")||A.equals("UH")".

Referring to FIG. 15, the syntax definition information 30 may be defined so that a method written in the BRMS natural language is converted into a method written in the DRL language. In the BRMS natural language, it is possible to designate a method or an argument by enclosing the method in << >> and enclosing the argument in < >. An argument of the method can designate all types of element variables. For example, a BRMS natural language sentence reciting that "Method: <<Character String Acquisition>> Character string from <1>th character to <1>th character of <A> is identical to "1" is converted into a DRL language sentence "rule Function. call Sub String(A.1, 1).equals ("1")".

Referring to FIG. 16, the syntax definition information 30 may be defined so that a specific syntax of a BRMS natural language sentence written in one control structure is divided to a plurality of different control structures and then converted into DRL language sentences. For example, a numerical condition of a BRMS natural language sentence is written in the condition unit, while this is divided and written into the definition unit and the condition unit in DRL language sentences. Specifically speaking, a BRMS natural language sentence written in the condition unit reciting that "Numerical Condition: There is no A, here attribute of A is the same as that of B" is divided and converted into a DRL language sentence "$var1:Long ( ) from accumulate ($a1: A(A.attribute!=null&&A.attribute.equals (B), count ($a1)))" written in the definition unit and a DRL language sentence "$var1==0" written in the condition unit. Incidentally, the DRL language sentence written in the definition unit has a nested structure which uses the function "count" as an argument of the function "accumulate" and the argument inside the nested structure is prioritized upon conversion into the DRL language sentence. Regarding such a nested structure, the CPU 11 analyzes the syntax of the entire structure and then sequentially conducts the language conversion from inside the nested structure towards the outside of the nested structure.

Next, the details of the language conversion processing will be explained with reference to FIG. 17 to FIG. 22.

In step 101, an operating personnel enters an instruction to perform the language conversion from the BRMS natural language sentence to the DRL language sentence.

In step 102, the CPU 11 recursively repeats processing 102A for reading the class definition information 41 from the storage device 16 with respect to each class definition.

In step 103, the CPU 11 recursively repeats processing 103A for reading the rule constant information 42 from the storage device 16 with respect to each rule constant.

In step 104, the CPU 11 recursively repeats processing 104A for reading the rule method information 43 from the storage device 16 with respect to each rule method.

In step 105, the CPU 11 executes the language conversion processing (from step 106 to step 110) with respect to each design description stored in an input folder. The design description herein means a BRMS natural language sentence which is a target of the language conversion. As default settings for step 105, the CPU 11 resets the value of a parameter for counting the number of errors to zero, resets the value of a parameter for managing a package to zero, resets the value of a parameter for managing a numerical condition to zero, resets the value of a parameter for managing the status of the numerical condition to "false" (the status of the numerical condition becomes "true" when the numerical condition is processed), and resets the value of a parameter for managing the number of variables declared by the definition unit to zero.

In step 106, the CPU 11 recursively repeats processing 106A for reading a BRMS natural language sentence from the input interface 14 with respect to each BRMS natural language sentence.

In step 107, the CPU 11 executes processing for dividing the BRMS natural language sentence by using the syntax definition information 30 and the conversion information 40 and creates BRMS natural language information, syntax division information, and element variable information. The BRMS natural language information includes information about the content, line position, and column position of the BRMS natural language sentence, flags for judging sentences in a numerical condition, the number of divisions via syntax division of the BRMS natural language sentence, and the content of the syntax division of the BRMS natural language sentence. The syntax division information includes information about the number, key, or syntax of the syntax definition information, the content of the BRMS natural language sentence, a DRL language sentence which is the conversion result, the number of variable elements used in the BRMS natural language sentence, and the content of the variable elements used in the BRMS natural language sentence. The element variable information includes information about element variables such as $A$ and $B$ of the syntax definition information, types of the element variables (such as functions, mathematical formulas, arrays, character strings, numerical values, null, and variables), forms of the element variables (such as character strings and integers), the content of element variables of the BRMS natural language sentence, and the content of element variables of the DRL language sentence which is the conversion result. The details of step 107 will be explained later.

In step 108, the CPU 11 judges whether an error exists or not.

When there is an error, the CPU 11 outputs error information (step 109). When there is no error, the CPU 11 executes the DRL language sentence creation processing (step 110).

In step 110, the CPU 11 opens an output file (step 111), outputs a header portion (step 112), executes DRL language syntax output processing (step 113), and closes the output file (step 114). In step 112, the CPU 11 outputs a fixed import text, package information, an import text of a Rule Function, and Rule text to the header portion, and makes a global declaration of the Rule Function. In step 113, the CPU 11 recursively repeats processing 113A for outputting a condition definition of a numerical condition with respect to each numerical condition and further recursively repeats processing 113B for outputting the DRL language syntax with respect to the syntax division information. Incidentally, the processing 113A and 113B is repeated recursively with respected to the BRMS natural language information.

In step 107 of dividing the BRMS natural language sentence, the CPU 11 repeats step 201 to step 205 recursively with respect to the BRMS natural language sentence.

In step 201, the CPU 11 performs keyword matching from the beginning of the BRMS natural language sentence. During the keyword matching, character strings constituting the BRMS natural language sentence are compared with a keyword and whether a character string which matches the character string for the keyword exists in the BRMS natural language sentence or not is analyzed. The "keyword" means a character string of a syntax element which serves as an index for the syntax analysis; and specifically, the keyword includes logical operators and control structures. When the keyword exists in the BRMS natural language sentence, the CPU 11 creates syntax division information by using the syntax definition information 30 (step 202). The syntax division information includes a syntax definition number, information indicating whether the BRMS natural language sentence which is the analysis object is a key syntax or not, the BRMS natural language sentence defined in the syntax definition information 30, and information about a DRL language syntax (syntax for objects) corresponding to the BRMS natural language sentence. Incidentally, the "syntax definition number" is the number assigned to identify each syntax and this number is defined in the syntax definition information 30. The "key syntax" means a syntax for which the use of the "keyword" is defined. The CPU 11 judges whether or not a character string which defines a control syntax is written in a specific syntax of the BRMS natural language sentence; and when an affirmative judgment result is obtained, the specific syntax may be converted into a DRL language sentence which varies depending on the type of the control syntax. On the other hand, when no keyword exists in the BRMS natural language sentence, the CPU 11 executes step 204 of comparing a syntax element other than the keyword with the BRMS natural language sentence and thereby analyzing the BRMS natural language sentence and executes step 205 of creating a DRL language syntax by converting element variables. The details of steps 204 and 205 will be explained later.

After the completion of step 202 or step 205, the CPU 11 sets numerical condition information in a case of a syntax for the numerical condition (step 203). The numerical condition information includes the numerical condition, the number of syntaxes in the numerical condition, and information about a management number of the BRMS natural language sentence.

In step 204, the CPU 11 recursively repeats processing 204A for comparing the BRMS natural language sentence with the syntax elements and creating syntax division information with respect to each of the syntax elements and the syntax definition information. The syntax division information includes the syntax definition number, information indicating whether the BRMS natural language sentence which is the analysis object is a key syntax or not, the BRMS natural language sentence, the number of element variables (the number of element variables included in one BRMS natural language sentence), and information about the element variables.

Now the details of the processing 204A will be explained. Since the BRMS natural language sentence which is the analysis object of the processing 204A does not include the "keyword," it has, for example, a syntax as illustrated in FIG. 4. The CPU 11 compares character strings of the BRMS natural language sentence, which is the analysis object, with character strings of syntax elements constituting each syntax defined in the syntax definition information 30 (for example, character strings of "is" and "identical to") and judges which one of the plurality of syntaxes defined in the syntax definition information 30 matches the syntax of the BRMS natural language sentence which is the analysis object. Under this circumstance, the CPU 11 considers a character string, from among the character strings constituting the BRMS natural language sentence which is the analysis object, which does not match the character strings of the syntax elements (excluding element variables) constituting each syntax defined in the syntax definition information 30, as an "element variable." As a result of such processing, when the CPU 11 determines that the syntax of the BRMS natural language sentence which is the analysis object and illustrated in FIG. 4 is the one having the character strings "is" and "identical to" as syntax elements, the CPU 11 determines that the syntax of the BRMS natural language sentence which is the analysis object matches the syntax illustrated in FIG. 3 which is defined in the syntax definition information 30. If matching of the syntaxes is determined, the CPU 11 determines, as illustrated in FIG. 5, that "contractor type code of contractor information (present)" which is a syntax element of the BRMS natural language sentence which is the analysis object corresponds to the element variable $A$, and "01" which is a syntax element of the BRMS natural language sentence which is the analysis object corresponds to the element variable $B$. After confirming, by referring to the syntax definition information 30, that "contractor type code of contractor information (present)" is a class variable, the CPU 11 converts "contractor type code of contractor information (present)" into $Contractor Information_Present_get Contractor Type Code( ) on the basis of the class definition information 41. Meanwhile, a phrase enclosed in " " is recognized as a "character string." The CPU 11 coverts "01" which is a character string into "01" as it is. As a result of such processing, the business rule statement written in the natural language as illustrated in FIG. 4 is converted into the DRL language sentence illustrated in FIG. 6.

In step 205, when the relevant syntax element is $Bom$, the CPU 11 recursively repeats processing 205A for acquiring a class name from the class definition and managing a package of the class, with respect to the syntax elements; and when the relevant syntax element is other than $Bom$, the CPU 11 recursively repeats processing 205B for converting the syntax element of the BRMS natural language sentence, with respect to the syntax elements. Under this circumstance, $Bom$ is defined as the class name in the class definition information 41. The class has information called a package and the processing 205A manages the package. In short, among the syntax elements of the BRMS natural language sentence which is the analysis object, the processing 205A is executed with respect to $Bom$ and the processing 205B is executed with respect to the syntax elements other than $Bom$. The details of the processing 205B will be explained later.

After the completion of steps 205A and 205B, the CPU 11 manages setting variable information when the BRMS natural language sentence is a setting (step 205C). The setting variable information includes variables which are set in the definition unit (variables used in the BRMS natural language sentence), original variable names (Japanese class name), and information about classes (English names of the classes).

After the completion of step 205C, when the syntax element is an array, the CPU 11 recursively repeats processing 205D for breaking down array elements and connecting them with "or", with respect to each syntax element; and when the syntax element is other than an array, the CPU 11 recursively repeats processing 205E for replacing the element variables of the DRL language sentence with conversion content, with respect to each syntax element.

After the completion of step 205D and step 205E, when the BRMS natural language sentence is negative, the CPU 11 encloses the DRL language sentence with "!(" and ")" (step 206F).

After the completion of step 206F, the CPU 11 defines a syntax for objects of the syntax definition information to the numerical condition of the numerical condition information and defines a syntax for variables of the syntax definition information to the DRL language syntax of the syntax definition information (step 205G).

In the processing 205B for converting the syntax elements of the BRMS natural language sentence, the CPU 11 executes conversion processing according to the types of the syntax elements. When the syntax element is a function, the CPU 11 executes BRMS natural language function conversion processing 301. In this processing 301, the CPU 11 retains content enclosed in << >> as a function name (step 301A), retains content enclosed in < > as an argument in a local array (step 301B), and converts the function name by referring to the rule method information 43 (step 301C). However, < > is nested, so that in step 301B, the processing is executed by treating the corresponding parentheses as the argument. After the completion of step 301C, the CPU 11 recursively repeats processing 301D for performing element conversion of the BRMS natural language and processing 301E for creating an argument by connecting the conversion results with "," with respect to each argument.

On the other hand, when the syntax element is a date, the CPU 11 checks if it is in the date format, and then converts it as a character string (step 302). When the syntax element is a mathematical formula, the CPU 11 executes BRMS natural language mathematical formula conversion processing 303. In this processing 303, the CPU 11 recursively repeats processing for separating element variables connected with an arithmetic operator (step 303A), performing the element conversion of the separated element variables (step 303B), and connecting the conversion results with an operator and creating a mathematical formula (step 303C). When the syntax element is an array, the CPU 11 deletes { } (step 304). An array is composed of elements enclosed in { }. When the syntax element is a character string, the CPU 11 deletes " " (step 305). A character string is composed of a character string enclosed in " ". When the syntax element is a numerical value, the CPU 11 converts it as it is (step 306). When the syntax element is "null", the CPU 11 converts it as it is (step 307). When the syntax element is a variable, the CPU 11 executes BRMS natural language variable conversion processing 308. In this processing 308, the CPU 11 divides the BRMS natural language sentence at "no" and cuts out element variables (step 308A). Then, the CPU 11 repeats processing 308B for attaching "$" immediately before a first element variable which has been cut out and processing 308C for converting a second and subsequent element variables into class attributes by referring to the class definition, with respect to each element variable. However, regarding the processing 308B, an element variable with "kono" attached thereto is converted into "this". Furthermore, regarding the processing 308C, when the acquired class attribute is an object type, a getter reference is set.

According to this embodiment, business rule statements written in a natural language can be automatically converted to DRL language sentences. Moreover, the language conversion processing can be simplified by converting the business rules to the DRL language sentences by means of a combination of a plurality of types of basic syntaxes. Furthermore, various conversion processing can be enabled by converting a business rule statement into different DRL language sentences depending on the types of the control syntax in which a specific syntax is written. Furthermore, a complicated nested structure can be analyzed appropriately and the language conversion can be performed by analyzing the syntax of the entire nested structure of a business rule statement and prioritizing an inner syntax inside the nested structure upon conversion to a DRL language sentence.

Incidentally, the language conversion program 20 may be transmitted to other computer systems from the language conversion apparatus 10 via transmission media or via transmitted waves in the transmission media. The transmission media means media having a function that transmits information like networks such as the Internet and communication lines such as telephone lines.

REFERENCE SIGNS LIST 10 language conversion apparatus
11 CPU
12 RAM
13 ROM
14 input I/F
15 output I/F
16 storage device
20 language conversion program
30 syntax definition information
40 conversion information
41 class definition information
42 rule constant information
43 rule method information

The invention claimed is:

1. A language conversion apparatus comprising:
a storage device that stores syntax definition information for defining a plurality of syntaxes for converting a business rule statement, which is written in a natural language and composed of one or more syntax elements, into a Drools Rule Language sentence on a syntax basis, and conversion information for converting an element variable included in the syntax element or syntax elements of the business rule statement into an element variable of the Drools Rule Language sentence;
a syntax analysis device for judging which one of the plurality of syntaxes defined by the syntax definition information matches a syntax of the business rule statement, by comparing a character string of the business rule statement with a character string of the syntax element constituting each syntax defined by the syntax definition information;
a conversion device that converts the business rule statement into the Drools Rule Language sentence by converting the element variable of the business rule statement into the element variable of the Drools Rule Language sentence with reference to the conversion information and converting the syntax element other than the element variable of the business rule statement into a syntax element of the Drools Rule Language sentence having the syntax which has been judged to match the syntax of the business rule statement, wherein the syntax definition information is classified into patterns so that the business rule statement can be converted into the Drools Rule Language sentence by means of a combination of a plurality of types of basic syntaxes; and
an interface connected to the apparatus, which outputs the converted Drools Rule Language sentence.

2. The language conversion apparatus according to claim 1, wherein the syntax definition information includes information about character strings, which distinguish and define a control syntax depending on its type, and defines conversion of a specific syntax written in the business rule statement into the Drools Rule Language sentence which varies depending on the type of the control syntax in which the specific syntax is written; and wherein the syntax analysis device judges whether or not a character string which defines the control syntax is written in the specific syntax of the business rule statement; and when an affirmative result of the judgment is obtained, the conversion device converts the specific syntax into the Drools Rule Language sentence which varies depending on the type of the control syntax.

3. The language conversion apparatus according to claim 1, wherein the business rule statement includes a nested structure in which a plurality of syntaxes are nested; wherein the syntax analysis device analyzes a syntax of the entire nested structure; and wherein the conversion device prioritizes an inner syntax inside the nested structure upon conversion to the Drools Rule Language sentence.

4. A language conversion method executed by a computer, comprising:
a step of comparing a character string of a syntax element, which constitutes each syntax defined by syntax definition information for defining a plurality of syntaxes for converting a business rule statement written in a natural language and composed of one or more syntax elements into a Drools Rule Language sentence on a syntax basis, with a character string of the business rule statement, thereby judging which one of the plurality of syntaxes defined by the syntax definition information matches a syntax of the business rule statement;

a step of converting the business rule statement into the Drools Rule Language sentence by referring to conversion information for converting an element variable included in the syntax element or syntax elements of the business rule statement into an element variable of the Drools Rule Language sentence and thereby converting the element variable of the business rule statement into the element variable of the Drools Rule Language sentence, and converting the syntax element other than the element variable of the business rule statement into a syntax element of the Drools Rule Language sentence having the syntax which has been judged to match the syntax of the business rule statement, wherein the syntax definition information is classified into patterns so that the business rule statement can be converted into the Drools Rule Language sentence by means of a combination of a plurality of types of basic syntaxes; and a step of outputting the converted Drools Rule Language sentence by the computer.

5. A non-transitory computer readable medium storing a program which causes a computer to execute:

a step of comparing a character string of a syntax element, which constitutes each syntax defined by syntax definition information for defining a plurality of syntaxes for converting a business rule statement written in a natural language and composed of one or more syntax elements into a Drools Rule Language sentence on a syntax basis, with a character string of the business rule statement, thereby judging which one of the plurality of syntaxes defined by the syntax definition information matches a syntax of the business rule statement;

a step of converting the business rule statement into the Drools Rule Language sentence by referring to conversion information for converting an element variable included in the syntax element or syntax elements of the business rule statement into an element variable of the Drools Rule Language sentence and thereby converting the element variable of the business rule statement into the element variable of the Drools Rule Language sentence, and converting the syntax element other than the element variable of the business rule statement into a syntax element of the Drools Rule Language sentence having the syntax which has been judged to match the syntax of the business rule statement, wherein the syntax definition information is classified into patterns so that the business rule statement can be converted into the Drools Rule Language sentence by means of a combination of a plurality of types of basic syntaxes; and a step of outputting the converted Drools Rule Language sentence by the computer.

* * * * *